United States Patent
Jagiella et al.

[11] Patent Number: 5,192,847
[45] Date of Patent: Mar. 9, 1993

[54] NOZZLE FOR A TOOL FOR WORKING MATERIAL

[75] Inventors: Manfred Jagiella, Karlsruhe; Wolf Wiesemann, Gaggenau; Michael Holzmann, Rastatt, all of Fed. Rep. of Germany

[73] Assignee: C.A. Weidmuller GmbH & Co., Detmold, Fed. Rep. of Germany

[21] Appl. No.: 755,658

[22] Filed: Sep. 6, 1991

[30] Foreign Application Priority Data

Sep. 6, 1990 [DE] Fed. Rep. of Germany ....... 4028338

[51] Int. Cl.$^5$ .............................................. B23K 26/00
[52] U.S. Cl. .............................. 219/121.6; 219/121.78; 219/121.67; 372/701
[58] Field of Search ....................... 219/121.67, 121.72, 219/121.83, 121.84, 121.63, 121.64, 121.78, 121.79; 372/701

[56] References Cited

U.S. PATENT DOCUMENTS 4,298,784 11/1981 Schmall .................. 219/121.81 X
4,682,004 7/1987 Schmall ............................ 219/121.54
4,794,222 12/1988 Funayama et al. ............ 219/121.78

Primary Examiner—C. L. Albritton
Attorney, Agent, or Firm—Anderson Kill Olick & Oshinsky

[57] ABSTRACT

The invention relates to a nozzle for a tool for working material, for example for laser cutting. The nozzle contains an electrically conducting nozzle body (2), at the tip of which is arranged a nozzle electrode (12) electrically insulated from it. A cap element (15) accomodates the nozzle electrode (12) and is in engagement with the nozzle body (2). At the same time, the cap element (15) presses the nozzle electrode (12) against an insulating body (9). The cap element (15) and the nozzle electrode (12) are insulated from one another by means of an electrically non-conducting layer, making possible shielding of the nozzle electrode (12) a long way into the tip region. The cap element (15) furthermore protects the nozzle electrode (12) from lateral forces in order to avoid damage to the insulating body (9) which accommodates the nozzle electrode (12).

17 Claims, 1 Drawing Sheet

NOZZLE FOR A TOOL FOR WORKING MATERIAL

The invention relates to a nozzle for a tool for working material in accordance with the preamble of patent claim 1.

A nozzle of this kind is already universally known. It contains an electrically conducting nozzle body, on the tip of which a nozzle electrode electrically insulated from it is secured using an electrically conducting cap element which is in engagement with the nozzle body.

In the known nozzle, the nozzle electrode is screwed into the tip of a ceramic body of hollow-cylindrical design, thus being firmly connected to it. The ceramic body is then pressed against the tip of the nozzle body, more specifically with the aid of a cap nut which is pushed over the ceramic body and screwed to the nozzle body. This cap nut leaves the nozzle electrode completely free and serves, inter alia, to shield a lead in the ceramic body via which the nozzle electrode is connected to a contact piece on the nozzle body, the said piece, for its part, being connected to a socket which is present on the nozzle body and serves to accommodate a coaxial plug.

The nozzle can be used, for example, for working workpieces with the aid of laser irradiation, for example for cutting a workpiece with the aid of a high-power laser beam. The laser beam here passes through a channel in the center of the nozzle which also leads through the ceramic body and the nozzle electrode.

The nozzle electrode is also used for capacitive clearance measurements in order to guide the nozzle relative to the workpiece. For this purpose, a sensor signal which is supplied by the nozzle electrode and appears at the output of the abovementioned socket is processed further.

In order to protect the sensor signal from external disturbing influences, shielding is carried out. In the known nozzle, however, the shielding ends in the region of the cap nut, with the result that there is a very large electrical stray field between the nozzle electrode and the workpiece since the nozzle electrode is outside the cap nut. This leads to a high lateral sensitivity of the sensor system, with the result that, for example, workpiece structures very close to a cutting line exert a large influence on the positional control of the nozzle and this is undesired.

In the known nozzle, the nozzle electrode and the ceramic body are furthermore not protected from mechanical influences. It is quite possible that the nozzle electrode will be driven against a workpiece structure, there thus being the risk that it will break out of the ceramic body. The ceramic body must then be replaced, leading to a relatively long interruption to the working of the workpiece. Moreover, the ceramic body is relatively expensive.

The object on which the invention is based is to further develop the nozzle of the type stated at the outset in such a way that shielding is possible into the tip region of the nozzle electrode and a small stray field is obtained. At the same time, it should be ensured that the nozzle electrode and the insulating body carrying it can no longer be damaged if the nozzle tip runs up against an obstacle.

The solution to the object set is indicated in the defining part of patent claim 1. Advantageous developments of the invention can be taken from the subclaims.

A nozzle according to the invention is distinguished by the fact that the cap element accommodates the nozzle electrode and presses against the latter and that the cap element and the nozzle electrode are insulated from one another by means of an electrically nonconducting layer.

In the nozzle according to the invention, the nozzle electrode is situated predominantly within the cap element and only its tip projects from the latter. Since the cap element is in electrical contact with the nozzle body to which the shielding potential is applied, shielding can be extended into the region of the tip of the nozzle electrode. In addition, the electric field between the nozzle electrode and the workpiece can be concentrated on the tip region of the nozzle electrode, with the result that there is virtually no stray field any longer. The lateral sensitivity of the sensor system is thereby considerably reduced. It thus does not respond as rapidly to object structures which are, for example, situated next to a cutting path, in this way making possible satisfactory clearance control.

The nozzle electrode and the insulating body carrying it are furthermore better protected from mechanical damage. On the one hand, the nozzle electrode is covered by the cap element, with the result that, in the event of collision with an object, the cap element absorbs the mechanical forces since it is firmly connected to the very stable nozzle body. It is therefore virtually impossible for a nozzle electrode to break out of the insulating body carrying it in the event of a collision with an object. Even if only the tip of the nozzle electrode, projecting from the cap element, is acted upon by a lateral force, there is no risk of it breaking out of the insulating body since the cap element rests very tightly against the circumference of the nozzle electrode via the electrically nonconducting layer and tilting of the nozzle electrode is therefore not possible. On the other hand, the insulating body carrying the nozzle electrode is also completely covered by the nozzle body and the cap element, with the result that external forces cannot act directly on it either.

The electrically nonconducting layer can advantageously be a Teflon layer or a ceramic layer, which withstands even high temperatures, such as those which are generated particularly during cutting processes.

The electrically nonconducting layer can here be designed as a surface layer of the cap element, i.e. as a layer which lies on the surface of the cap element and is firmly joined to the latter. The cap element and the electrically nonconducting layer thus form a single component.

If the cap element consists of aluminum, the surface layer can advantageously be an anodized oxide layer. An anodized oxide layer of this kind can be produced in a simple manner and is in practice introduced into the surface of the cap element, with the result that no additional coating material is required and hence a very stable cap element is obtained. It is necessary that the electrically nonconducting layer should be situated in the region of contact between the cap element and the nozzle electrode. It has however proven advantageous for the electrically nonconducting layer to be present on the entire surface region of the cap element, with the exception of that region which must be in electrical contact with the nozzle body. In this way, it is, for example, possible to prevent conductive materials which fall into the boundary region between the nozzle electrode and the cap element causing an electrical short circuit between the two. The abovementioned anodized oxide layer is most suitable for the formation of the electrically non-conducting layer on the surface of the cap element since no additional material then has to be applied to the cap element. In principle, however, the cap element can also consist of some other material which is capable of forming on its surface an insulating oxide layer which serves as an electrically nonconducting layer. In the region of the connection between the cap element and the nozzle body, the electrically non-conducting layer is then removed, e.g. scratched off. The electrically non-conducting layer can also be restricted only to that portion of the surface of the cap element which touches the nozzle electrode.

According to an advantageous development of the invention, the cap element is designed as a cap nut which is screwed onto an external thread which is situated at the tip of the nozzle body. In the region of the thread there is an electrical contact between the cap nut and the nozzle body. Otherwise, the surface of the cap nut is of electrically insulating design. Due to the thread it is possible in a simple manner to separate the cap nut from the nozzle body in order, if required, to renew the nozzle electrode or replace it by some other type.

According to a very advantageous development of the invention, the nozzle electrode is inserted into an inner channel of a hollow-cylindrical insulating body which is arranged within the tip of the nozzle body. The insulating body thus no longer has an internal thread into which the nozzle electrode could be screwed. It is therefore possible to produce the insulating body and the nozzle electrode at a more favorable cost. The nozzle electrode can be of externally cylindrical or conical design, the tip of the cone forming the tip of the nozzle body.

According to another advantageous embodiment of the invention, the nozzle electrode, which can, for example, consist of copper or some other suitable, electrically conductive material, has a circumferential flange via which the cap element presses the insulating body against a seat of the nozzle body.

If it is necessary for the insulating body to be exchanged from time to time, it can be removed easily from the nozzle body. It is inserted into the latter merely with a sliding fit and rests on a seat which is obtained by a radial widening of the channel extending in the interior of the nozzle body. If, after the introduction of the insulating body into the nozzle body, the nozzle electrode is inserted into the insulating body, the nozzle electrode can be pulled against the insulating body via its circumferential flange when the cap element is screwed on or placed on, thus being pressed against its seat. The system comprising the insulating body and the nozzle electrode can therefore be secured reliably on the tip of the nozzle. In order to prevent rotation of the insulating body, the latter can furthermore be secured by an axial pin held in the seat. An anti-rotation safeguard of this kind is required to prevent a lead wire passed through the insulating body from being sheared off inadvertently.

The insulating body advantageously has an axial wall channel for accommodating an electric lead which is in contact with that side of the circumferential flange which faces the insulating body. At that end wall of the insulating body which faces the nozzle electrode, the lead can, for example, open into a lead pad which consists, for example, of solder and comes into contact with the nozzle electrode when the latter is inserted into the insulating body. This guarantees reliable transmission of the sensor signal from the nozzle electrode to the electronic evaluation unit.

The said electric lead through the axial wall channel of the insulating body runs along the outside of the nozzle body as far as a socket for a coaxial plug which is secured in the outer wall of the nozzle. In order to shield this lead too, the nozzle body is surrounded by an electrically conducting sleeve which is arranged at a distance from it and is in electrical contact with it. This sleeve can, for example, be screwed onto the same thread onto which the cap nut is screwed and which is situated at the tip of the nozzle body. The electrical contact between the nozzle body and the sleeve is established via this thread.

The drawing shows an illustrative embodiment of the invention. In the drawing.

The invention is described in greater detail below with reference to FIGS. 1 and 2.

Figure 1:
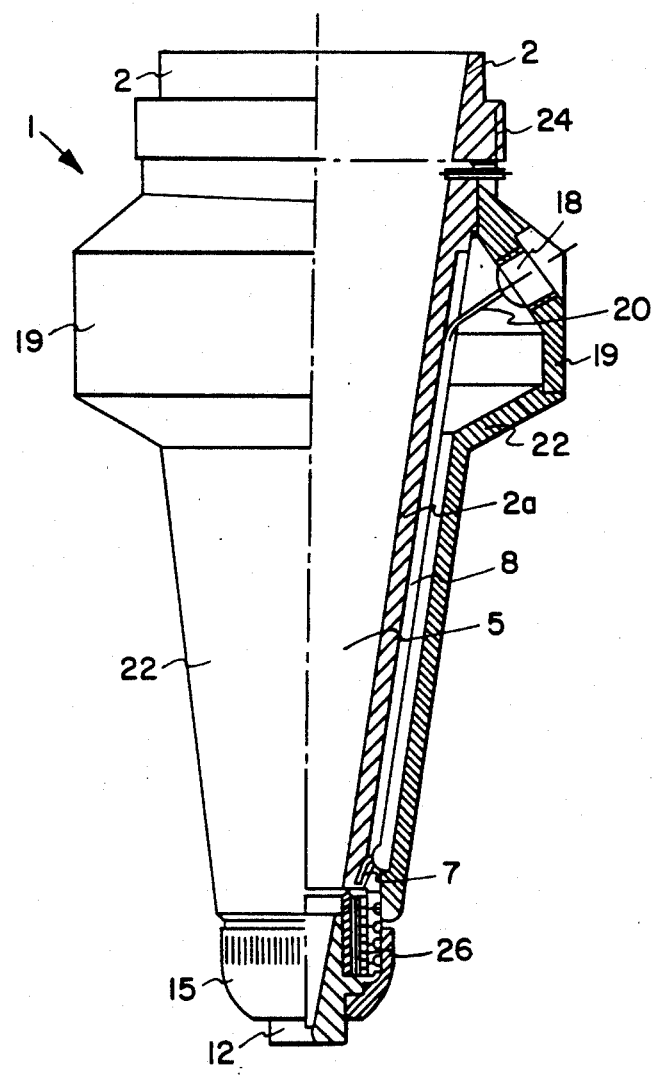
FIG. 1 shows a nozzle in side view and in section.

A nozzle according to the invention for a tool for working material is depicted in the form of a side view in the left-hand half in FIG. 1. The right-hand half of FIG. 1, on the other hand, shows an axial section through the nozzle. The same applies to FIG. 2.

Figure 2:
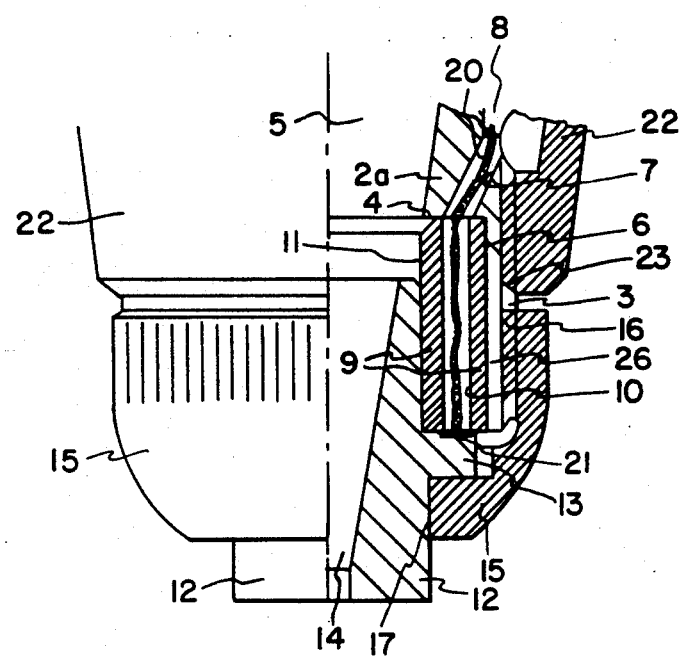
FIG. 2 shows the tip region of the nozzle in side view and in section.

The nozzle according to the invention, which in FIGS. 1 and 2 bears the reference 1, has a nozzle body 2 which consists, for example, of high-grade steel. In its upper region 2a the nozzle body 2 is of conical design, both on the outside and on the inside. In its lower or tip region 2b, the nozzle body 2 is of hollow-cylindrical design. The tip region 2b of the nozzle body 2 here bears an external thread 3. Its inside diameter and its axial depth in the interior are chosen so that a step or seat 4 is obtained in the wall of the nozzle body 2.

Overall, therefore, a conically tapering channel 5 is formed in the interior of the nozzle body 2, the said channel making a transition in the tip region of the nozzle body 2 into a cylindrical channel 6 which has a larger inside diameter than the inside diameter of the conical channel 5 at the transition. This can be seen most readily in FIG. 2.

In the wall of the nozzle body 2 there is a passage 7 which connects the cylindrical channel 6 in the vicinity of its wall region with a groove 8 which extends on the outer circumference of the upper region 2a of the nozzle body 2 and extends in its axial direction. The groove 8 extends almost as far as the upper end of the nozzle body 2. The passage 7 and the groove 8 serve to accommodate an insulated signal lead, as will be explained below.

Inserted in the cylindrical channel 6 and fitting in it is a hollow-cylindrical insulating body 9, the outside diameter of which corresponds to the inside diameter of the cylindrical channel 6. The inside diameter of the hollow-cylindrical insulating body 9 corresponds to the inside diameter of the conically tapering channel 5 in the region of the seat 4. The insulating body 9 rests on the seat 4 and its axial height is such that it is flush with the end face of the tip region 2b of the nozzle body 2. In the present illustrative embodiment, the insulating body consists of ceramic and in its wall contains an axial through hole 10 which is in alignment with the passage 7.

In its central through opening 11, the hollow-cylindrical insulating body 9 accommodates an externally cylindrical nozzle electrode 12 which can be inserted into the through opening 11 and pulled out of the latter in the axial direction. The nozzle electrode 12 consists, for example, of copper and, in the region of the insulating body 9, has an outside diameter which corresponds to the inside diameter of the central through opening 11 of the said insulating body. The nozzle electrode 12 is furthermore provided with a circumferential flange 13, which comes to rest on the end face of the insulating body 9 and thus fixes the position of the nozzle electrode 12 relative to the insulating body 9. This position is chosen so that a conically tapering channel 14 within the nozzle electrode 12 extends the conically tapering channel 5 in the nozzle body 2 virtually as far as the tip of the nozzle electrode 12. The free tip of the nozzle electrode 12, which is situated beyond the flange 13 and points away from the insulating body 9, has a cylinder outside diameter which is smaller than the outside diameter of the nozzle electrode 12 in the flange region 13.

In order to fix the nozzle electrode 12 in the insulating body 9 and in order to fix the insulating body 9 in the cylindrical channel 6 of the nozzle body 2, a cap nut 15 is provided which has an internal thread 16, such that it can be screwed onto the external thread 3 of the nozzle body 2, which thread is situated in the tip region 2b of the said body. At its end face, the cap nut 15 has an axial through opening 17, the inside diameter of which corresponds to the outside diameter of the nozzle electrode 12 in its tip region. The inside diameter of the axial through opening 17 is thus smaller than the outside diameter of the nozzle electrode 12 in its flange region 13. This means that when the cap nut 15 is screwed onto the nozzle body 2, it takes the nozzle electrode 12 along with it via the flange 13 of the latter and presses it against the insulating body 9, the latter striking against the seat 4. In this way, it is possible to secure the nozzle electrode 12 and the insulating body 9 on the nozzle body 2.

In the illustrative embodiment, the cap nut 15 consists of aluminum and is provided with a thin anodized oxide layer, which is electrically nonconducting. This electrically nonconducting layer extends over the entire surface of the body of the cap nut 15 but not in the region of its internal thread 16. In this way, an electrical connection is established between the cap nut 15 and the nozzle body 2 via the thread 3, 16, it being possible to apply a shielding potential to the nozzle body 2. This reaches into the region of the cap nut 15, making it possible to shield the nozzle electrode 12 virtually into its tip region. Due to the anodized oxide layer which is present, there is no electrical connection between the cap nut 15 and the nozzle electrode 12.

On the other hand, the nozzle electrode 12 is insulated from the nozzle body 2 by the insulating body 9, allowing a measurement signal produced with the aid of the nozzle electrode 12 to be supplied via a lead system to an electronic evaluation unit situated outside the nozzle.

The lead system includes, inter alia, a socket 18 for a coaxial plug (not depicted). This socket 18 is situated in a metallic sleeve 19 at the upper end of the nozzle body 2, the metallic sleeve 19 surrounding the nozzle body 2, being open towards the nozzle tip and being connected in electrically conducting fashion to the nozzle body 2. In the interior of the nozzle 1, the socket 18 is connected to a signal lead 20 which first of all runs inside the groove 8 towards the nozzle tip, then through the passage 7 and is then passed through the axial through hole 10 in the insulating body 9.

The insulated lead 20 opens into a connection pad 21, which consists, for example, of solder or the like and comes to rest on the end face of insulating body 9 in order to establish a contact with the flange 13 of the nozzle electrode 12. A sensor signal transmitted via the signal lead 20 from the nozzle electrode 12 passes via the socket 18 into a coaxial cable and then into an electronic evaluation unit.

In order to shield the signal lead 20 situated in the groove 8 as well, the nozzle body 2 is furthermore surrounded by an electrically conducting conical sleeve 22 arranged at a distance from it. At its pointed end, this sleeve 22 has an internal thread 23, by which the sleeve 22 can likewise be screwed onto the external thread 3. The sleeve 22 is here designed in the upper region in such a way that it adjoins the sleeve 19. Via this sleeve 19 and via its internal thread 23, it is in electrically conducting contact with the nozzle body 2. It should also be mentioned in this context that the sleeve 22 must first of all be screwed onto the external thread 3 before the cap nut 15 can be screwed onto the external thread 3.

Deviating from the illustrative embodiment described, it is of course also possible to employ different shapes for the respective components and different materials. The only point of importance is that the cap element should be electrically insulated from the nozzle electrode and that the cap element should at the same time act on the nozzle electrode mechanically in order to fix it on the nozzle body. In this arrangement, the nozzle electrode 12 is situated predominantly within the cap element 15, with the result that blows to the nozzle electrode 12 are absorbed by the cap element 15. The cap element 15 simultaneously ensures better shielding of the signal path down to the nozzle electrode and simultaneously ensures a smaller stray field, leading to reduced lateral sensitivity of the sensor arrangement.

We claim:

1. A nozzle for a tool for working material, with an electrically conducting nozzle body (2), at the tip of which a nozzle electrode (12) electrically insulated from it is secured using an electrically conducting cap element (15) which is in engagement with the nozzle body (2), wherein the cap element (15) accommodates the nozzle electrode (12) and presses against the latter and wherein the cap element (15) and the nozzle electrode (12) are insulated from one another by means of an electrically nonconducting layer.

2. The nozzle as claimed in claim 1, wherein the electrically nonconducting layer is a Teflon layer.

3. The nozzle as claimed in claim 1, wherein the electrically nonconducting layer is a ceramic layer.

4. The nozzle as claimed in claim 1, wherein the electrically nonconducting layer is a surface layer of the cap element (15).

5. The nozzle as claimed in claim 4, wherein the cap element (15) contains aluminum and the surface layer is an anodized oxide layer.

6. The nozzle as claimed in claim 4, wherein the electrically nonconducting layer is present on the entire surface of the cap element (15), except in a region of its connection to the nozzle body (2).

7. The nozzle as claimed in claim 4, wherein the electrically nonconducting layer is restricted to a portion of the surface of the cap element (15), which touches the nozzle electrode (12).

8. The nozzle as claimed in claim 1, wherein the cap element (15) is designed as a cap nut.

9. The nozzle as claimed in claim 1, wherein the nozzle electrode (12) is introduced into a hollow-cylindrical insulating body (9) which is arranged within the tip of the nozzle body (2) to insulate the nozzle electrode from the nozzle body.

10. The nozzle as claimed in claim 9, wherein the nozzle electrode (12) is inserted into an inner channel (11) of the hollow-cylindrical insulating body (9).

11. The nozzle as claimed in claim 1, wherein the nozzle electrode (12) has a conical shape.

12. The nozzle as claimed in claim 10, wherein the nozzle electrode (12) has a circumferential flange (13) via which the cap element (15) presses the insulating body (9) against a seat (4) of the nozzle body (2).

13. The nozzle as claimed in claim 12, wherein the insulating body (9) has an axial wall channel (10) for accommodating an insulated electric lead (20) which is in contact with that side of the circumferential flange (13) which faces the insulating body (9).

14. The nozzle as claimed in claim 13, wherein the insulating body (9) is secured against rotation in the nozzle body (2) by an axial pin held in the seat (4).

15. The nozzle as claimed in claim 9, wherein the insulating body (9) consists of ceramic.

16. The nozzle as claimed in claim 1, wherein the nozzle body (2) is surrounded by an electrically conducting sleeve (22) arranged at a distance from it.

17. The nozzle as claimed in claim 16, wherein the cap element is a cap nut, the nozzle body (2) having a tip that bears an external thread (3), onto which the cap nut (15) and the sleeve (22) are screwed.

* * * * *